July 15, 1952 — M. W. WARREN ET AL — 2,603,340
ARTICLE HANDLING SYSTEM
Filed Aug. 25, 1949 — 2 SHEETS—SHEET 1
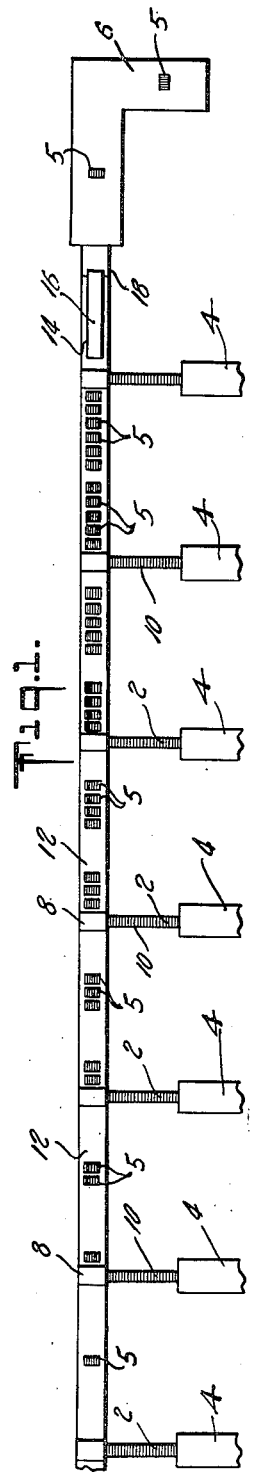
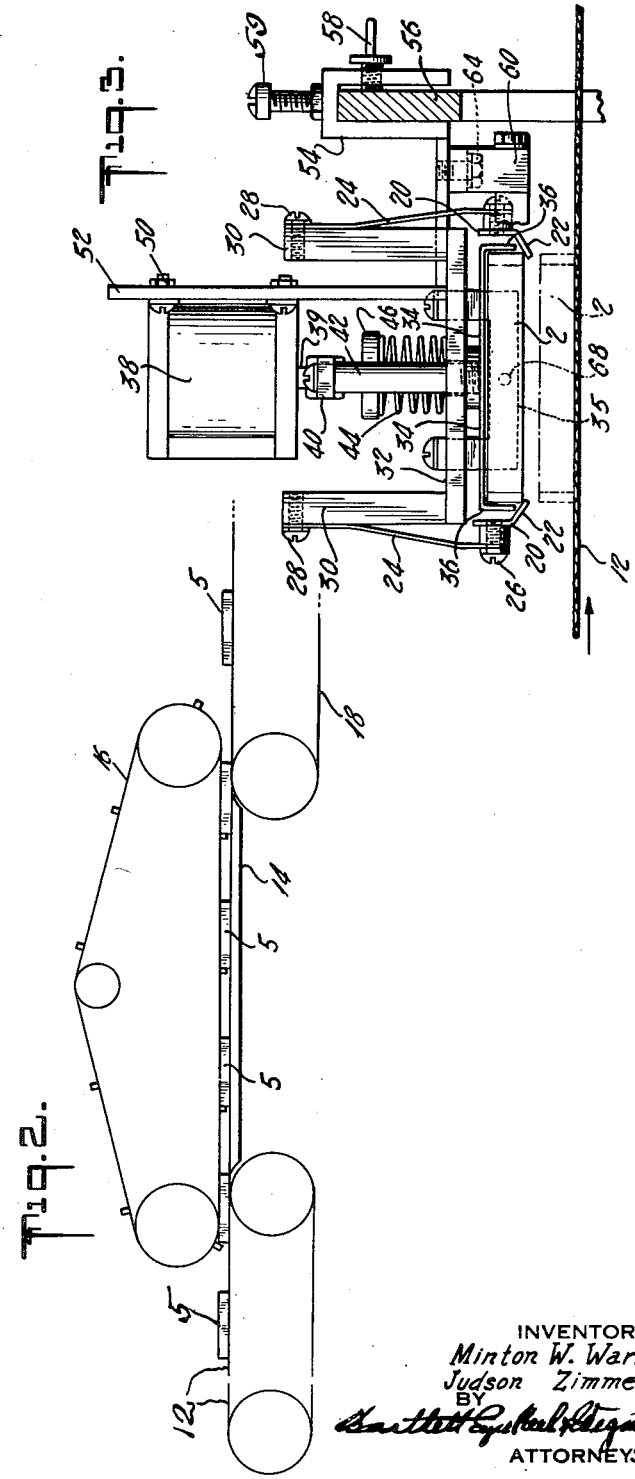
INVENTORS
Minton W. Warren,
Judson Zimmer, Jr.
BY
ATTORNEYS

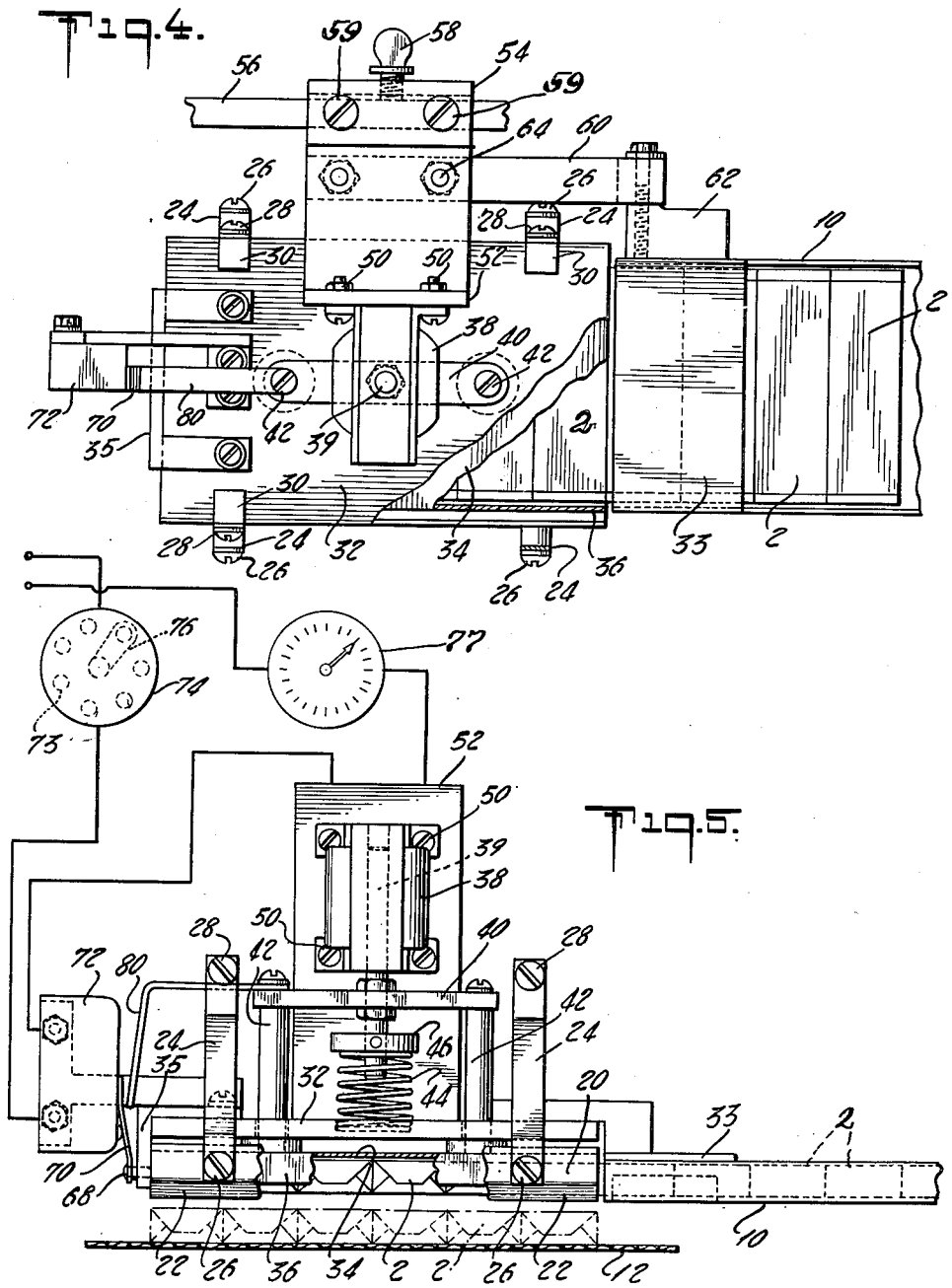

Patented July 15, 1952

2,603,340

UNITED STATES PATENT OFFICE 2,603,340

ARTICLE HANDLING SYSTEM

Minton W. Warren and Judson Zimmer, Jr., Canajoharie, N. Y., assignors to Beech-Nut Packing Company, Canajoharie, N. Y., a corporation of New York Application August 25, 1949, Serial No. 112,214

5 Claims. (Cl. 198—32)

Five cent packages of chewing gum are commonly sold in groups or units of six, each unit being enclosed within a wrapper of cellophane.

One of the objects of the present invention is to provide a system that is particularly adapted for receiving such packages from a plurality of wrapping machines, arranging them in units, and conveying them in predetermined spaced relation one behind the other to a machine for thus wrapping the units.

Another object of the invention is to provide a novel and improved system for assembling and conveying packages and other articles.

Another object of the invention is to provide an article assembling and discharging device that is simple in construction and efficient in operation.

The several features of the invention, whereby these and other objects may be attained, will be readily understood from the following description and accompanying drawings, in which:

Figure 1 is a diagrammatical plan view illustrating the system in association with seven gum wrapping machines, and a machine for wrapping packages of gum in units of six; the latter machine being known as an overwrapping machine;

Fig. 2 is a diagrammatical side view of a portion of the parts shown in Fig. 1;

Fig. 3 is a rear end view, partly in section, of an assembling and dumping device employed in our improved system;

Fig. 4 is a plan view of the device and a portion of an inspection slide associated with the device, certain parts being broken away and in section; and Fig. 5 is a side view of the same.

Our improved system is particularly adapted for use in arranging five cent packages of gum 2, as they are received from a plurality of gum wrapping machines 4, in groups or units 5 each containing six packages, and delivering the units one behind the other in spaced relation to an overwrapping machine 6 for individually wrapping the units.

As shown, an assembling and dumping device 8 is associated with each wrapping machine 4. The operator arranges the packages delivered by each wrapping machine edge to edge and moves them edgewise in a column over an inspection slide 10 into the assembling and dumping device. The several assembling and dumping devices are arranged over an endless conveyor 12 which is driven in timed relation to the operation of the several wrapping machines 4.

When the first six packages of the column pass into the device 8, the device may be operated so as to dump the six packages as a unit upon the conveyor 12. A timer, however, is provided whereby the several assembling and dumping devices are operated successively in timed relation to each other and to the speed of travel of the conveyor 12, so that the package units from all of said devices are deposited one behind the other in predetermined spaced relation on the conveyor 12.

In case any one of the assembling and dumping devices fails to receive six packages by the time it is set to operate by the timer, the operation thereof is delayed until it has received the complete number of packages in the unit, and then only when it is activated by the timer. This insures that all units conveyed to the overwrapping machine 6 each contain six packages.

The package units properly spaced on the conveyor 12 are moved thereby toward a dead plate 14, and are transferred by a flight conveyor 16 over the dead plate and to an intake conveyor 18 of the cellophane overwrapping machine 6.

Each dumping device comprises supporting rails 20 which are arranged parallel and spaced apart and have downwardly and inwardly inclined lower portions 22. Said inclined portions 22 are arranged in alinement with the associated inspection slide 10. The rails 20 are supported by spring arms 24 which have their lower ends secured to the rails by means of screws 26, and have their upper ends secured by screws 28 to supporting posts 30 on a base plate 32.

The operator positions the packages edge to edge on the inspection slide 10 and slides them beneath a cover plate 32 and over the inclined portions of the rails 20 until the foremost package strikes a stop 35. As the packages slide over the rails 22, they pass beneath a plunger plate 34 having downwardly extending longitudinal flanges or sides 36 which serve to guide the ends of the packages.

This plunger 34 is adapted to be moved downwardly so as to force the rails 22 yieldingly outwardly to discharge the packages on to the conveyor belt 12 by means of a solenoid 38, the core 39 of which is secured to a cross-bar 40 that is connected with the plunger plate by means of posts 42.

The plunger plate 34 is retracted so as to permit the rails 20 to receive the next group of packages from the inspection slide 10, by means of a coil spring 44 interposed between the base plate 32 and a collar 46 secured to the lower end of the core of the solenoid 38.

The solenoid 38 is secured by screws 50 to an upright 52 on the base plate 32. The assembly and dumping device is supported by means of a bracket 54 secured to the base plate 32 and to a rod 56 by means of a thumb screw 58. Adjusting screws 59 are screw-threaded through the bracket 54 and engage the top side of the rod 56. Also an arm 60 has one end pivotally mounted on a bracket 62 secured to the end of the inspection slide 10, and its other end secured by screws or bolts 64 to the bracket 54. This provision for supporting the assembling and dumping device enables it to be readily adjusted both longitudinally and vertically to aline its rails with the inspection slide 10.

When the packages have been fed into the device until the foremost package strikes the stop bar 35, six packages are positioned on the rails 20 and no further packages can be fed in. As the foremost package approaches the stop bar 35, it engages a button or pin 68 on the end of a lever 70 of a micro-switch 72, thus closing the switch.

The solenoid 38 and micro-switch 72 of each assembling and dumping device are electrically connected with one of the seven contacts 73 of a timing device 74. This device has a contact arm 76 which is rotated so as to successively engage the contacts 73 to successively close the circuit connection with the solenoid and microswitch of the several assembling and dumping devices, whereby the several devices act to successively dump or discharge the package units on the conveyor 12. The operation of the timing device is such with relation to the speed of the travel of the conveyor 12 that the package units in the several assembly and dumping devices are successively deposited on the conveyor belt in predetermined spaced relation. In case, however, there are less than six packages in any assembling and dumping device when the timing device acts to activate said device, then as the micro-switch is not closed, the device will not discharge the packages, and will not do so until the operator feeds in the additional packages required, and then only when said device is activated by the time device. A counter 77 is in the solenoid circuit of each device 8 so that the output of each device may be separately counted.

During the discharge movement of the plunger plate 34 of each assembling and dumping device 8, a finger 80 secured to the cross-bar 40 engages the micro-switch arm 70 so as to maintain the switch closed when the packages are discharged, until the timing device breaks the circuit connection with the solenoid. This ensures against the plunger plate 34 being retracted by the spring 44 until the packages are free of the rails 20.

Referring to Fig. 1 it will be noted that the package units will be discharged on to the conveyor 12 immediately under the assembling and dumping device 8 of the first wrapping machine. When the timing device calls for release of the package unit from the device 8 of the next wrapping machine, the package released by the first machine will be moved one-fourteenth of the distance between the two machines. This progression will be repeated in rotation, and the portion of the conveyor passing from the last device 8 to the flight conveyor 16 will be completely filled with evenly spaced units after the last wrapping machine has deposited its package unit on the conveyor and the timing device has completed fourteen revolutions. It will be apparent that the timing of the discharge of the package units may be varied as required depending upon the number of wrapping machines employed in the system.

As will be evident to those skilled in the art, our invention permits various modifications without departing from the spirit thereof or the scope of the appended claims.

What we claim is:

1. In a system of conveying packages from a plurality of wrapping machines arranged side by side and spaced apart, a conveyor driven in timed relation to the rate of delivery of packages from the wrapping machines, a device associated with each wrapping machine for receiving wrapped packages therefrom and depositing them on the conveyor in successive units with a predetermined number of packages in each unit, and means for operating all of said devices successively in timed relation to each other and to the speed of travel of the conveyor whereby the units from all of the wrapping machines are deposited successively on the conveyor one behind the other in predetermined spaced relation.

2. In a system of conveying packages from a plurality of wrapping machines arranged side by side and spaced apart, a conveyor driven in timed relation to the rate of delivery of packages from the wrapping machine, a device associated with each wrapping machine for receiving wrapped packages therefrom and successively depositing them on the conveyor in units with a predetermined number of packages in each unit, means for operating all of said devices in timed relation to each other and to the speed of travel of the conveyor whereby the units from all of the wrapping machines are deposited on the conveyor one behind the other in predetermined spaced relation, and means for controlling the operation of each device whereby the device is incapable of depositing a unit on the conveyor until the unit receives a predetermined number of packages.

3. An assembling and dumping device of the class described comprising two longitudinally extending members arranged side by side and spaced apart, means for sliding a column of articles over said members from the rear to the front ends thereof, a stop adjacent the front ends of said members for limiting the articles thus fed over said members to a predetermined number, electrically operated means for spreading said members and causing the articles to be discharged therefrom, a timer in circuit with said means for thus operating said members at predetermined intervals, and a device comprising a switch in circuit with said means and said timer for preventing said operation of said means except when a predetermined number of articles have been received on said members.

4. An assembling and dumping device of the class described comprising two longitudinally extending members arranged side by side and spaced apart, means for sliding a column of articles over said members from the rear to the front ends thereof, a stop adjacent the front ends of said members for limiting the articles thus fed over said members to a predetermined number, electrically operated means for spreading said members and causing the articles to be discharged therefrom, a timer in circuit with said means for thus operating said members at predetermined intervals, a device comprising a switch in circuit with said means and said timer for preventing said operation of said means except when a predetermined number of articles have been received on said members, a switch normally open in circuit with said means and said timer, and a device operated by the foremost article to close the switch when a predetermined number of articles have been fed over said members.

5. An assembling and dumping device of the class described, comprising a longitudinally extending support over which a column of articles is adapted to be fed from the front to the rear thereof, a stop for limiting the articles thus fed over the support to a predetermined number, means for holding said support in article-supporting position but permitting the support to be retracted to discharge the articles therefrom, means for retracting said support comprising a plunger, electrically operated means including a solenoid for moving the plunger in one direction to retract said support when the solenoid is energized, means for retracting the plunger when the solenoid is deenergized and for restoring said support to its article-supporting position, a timer in circuit with the solenoid for energizing and deenergizing the solenoid at predetermined intervals of time, a switch in circuit with the solenoid normally open so as to break the circuit, means acting automatically to close said switch when a predetermined number of articles have been fed over said support, and for opening the switch after the articles are discharged from said support, and means for maintaining the switch closed until the plunger has been retracted.

MINTON W. WARREN.
JUDSON ZIMMER, JR.

REFERENCES CITED

The following references are of record in the file of this patent:

UNITED STATES PATENTS

| Number | Name | Date |
|---|---|---|
| 1,320,504 | Spaulding | Nov. 4, 1919 |
| 2,050,711 | Malocsay | Aug. 11, 1936 |
| 2,295,232 | Mitchell | Sept. 8, 1942 |
| 2,432,561 | De Mott | Dec. 16, 1947 |
| 2,508,086 | Alvarez | May 16, 1950 |